(12) United States Patent
Robert et al.

(10) Patent No.: US 9,827,729 B2
(45) Date of Patent: Nov. 28, 2017

(54) FOOD CONTAINER TOP WITH INTEGRALLY FORMED UTENSIL

(71) Applicant: Phoenix Packaging Operations, LLC, Dublin, VA (US)

(72) Inventors: Stephen Robert, Mississauga (CA); William Traynor, Mississauga (CA)

(73) Assignee: PHOENIX PACKAGING OPERATIONS, LLC, Dublin, VA (US)

( * ) Notice: Subject to any disclaimer, the term of this patent is extended or adjusted under 35 U.S.C. 154(b) by 272 days.

(21) Appl. No.: 13/903,973

(22) Filed: May 28, 2013

(65) Prior Publication Data

US 2013/0313255 A1 Nov. 28, 2013

Related U.S. Application Data

(60) Provisional application No. 61/651,660, filed on May 25, 2012.

(51) Int. Cl.
*B65B 7/00* (2006.01)
*B60J 1/00* (2006.01)
(Continued)

(52) U.S. Cl.
CPC ........ *B29D 99/0096* (2013.01); *B29C 65/028* (2013.01); *B29C 65/08* (2013.01);
(Continued)

(58) Field of Classification Search
CPC ... B29C 66/53; B29C 66/534; B29C 66/5342; B29C 66/53421; B29C 66/5344;
(Continued)

(56) References Cited

U.S. PATENT DOCUMENTS 4,060,176 A    11/1977  Tobiasson
4,171,084 A *  10/1979  Smith ........................ 229/102
(Continued)

FOREIGN PATENT DOCUMENTS

EP    1207119 B1    10/2005
FR    2889481 A1    2/2007

OTHER PUBLICATIONS

Non-Final Office Action dated Nov. 6, 2015 in U.S. Appl. No. 14/079,619, 8 pages.
(Continued)

*Primary Examiner* — Philip Tucker
*Assistant Examiner* — Brian R Slawski
(74) *Attorney, Agent, or Firm* — Shook Hardy & Bacon, LLP (57) ABSTRACT

A molded article comprising a food container top, and a method for producing same, is disclosed. The method includes providing a mold for forming the molded article, wherein the mold defines a frame, a utensil located substantially coplanar with the frame and a frangible link between the frame and the utensil, providing an in-mold lidding film having a heat activatable lower surface, positioning the in-mold lidding film adjacent to an interior molding surface of the mold, molding the molded article from a heated thermoplastic resin contained within the mold, whereby the heated thermoplastic resin contacts a perimeter of the heat-activatable lower surface of the in-mold lidding film, and the perimeter of the heat-activatable lower surface of the in-mold lidding film is molded to the frame of the article such that the in-mold lidding film hermetically seals an opening defined by the frame.

20 Claims, 9 Drawing Sheets

(51) Int. Cl.
*E06B 3/00* (2006.01)
*E06B 5/00* (2006.01)
*E06B 7/00* (2006.01)
*B29C 47/00* (2006.01)
*B29C 65/00* (2006.01)
*B32B 37/00* (2006.01)
*B32B 38/14* (2006.01)
*F02F 1/06* (2006.01)
*C09J 5/00* (2006.01)
*B65D 41/00* (2006.01)
*B29D 99/00* (2010.01)
*B29C 65/02* (2006.01)
*B29C 65/08* (2006.01)
*B65D 17/50* (2006.01)
*B65D 17/00* (2006.01)
*B29C 65/40* (2006.01)

(52) U.S. Cl.
CPC .......... *B29C 65/40* (2013.01); *B29C 66/1122* (2013.01); *B29C 66/5344* (2013.01); *B29C 66/53461* (2013.01); *B29C 66/612* (2013.01); *B29C 66/71* (2013.01); *B65D 17/163* (2013.01); *B65D 17/501* (2013.01)

(58) Field of Classification Search
CPC .......... B29C 66/5346; B29C 66/53461; B29C 66/536; B29C 66/1122; B29C 66/43; B29C 65/02; B29C 65/18; B29C 65/40; B65D 17/16; B65D 17/161; B65D 17/163; B65D 17/50; B65D 17/501; B65D 2517/0013; B65D 2517/5083
USPC ... 156/60, 69, 108, 228, 242, 245, 246, 247, 156/277, 285, 286, 290, 292, 293, 303.1, 156/308.2, 308.4, 309.6; 220/200, 212, 220/359.1, 359.2, 359.4; 264/129, 132, 264/239, 241, 250, 259, 267, 268, 299, 264/319, 328.1, 330, 331.11
See application file for complete search history.

(56) References Cited

U.S. PATENT DOCUMENTS

| | | |
|---|---|---|
| 4,393,988 A | 7/1983 | Burke |
| 4,890,768 A | 1/1990 | Robinson |
| 4,961,513 A | 10/1990 | Gossedge |
| 5,085,333 A | 2/1992 | Dutt |
| 5,110,041 A | 5/1992 | Keeler |
| 5,238,630 A | 8/1993 | Tung |
| 5,661,900 A | 9/1997 | McLellan |
| 5,725,121 A | 3/1998 | Gianpaolo |
| 5,934,496 A | 8/1999 | Mogard et al. |
| 6,003,710 A * | 12/1999 | Huang .......... 220/212 |
| 6,258,312 B1 * | 7/2001 | Heyn .......... 264/252 |
| 6,371,324 B1 | 4/2002 | Torniainen |
| 6,375,067 B1 | 4/2002 | Moriyama |
| 6,604,646 B2 * | 8/2003 | Torniainen et al. .......... 220/212 |
| 6,773,653 B2 | 8/2004 | Miller |
| 7,012,032 B2 | 3/2006 | Cosentino |
| 7,168,461 B2 | 1/2007 | DeJonge |
| 2001/0015356 A1 * | 8/2001 | Jud .......... 220/359.1 |
| 2002/0060220 A1 | 5/2002 | Torniainen et al. |
| 2005/0115965 A1 * | 6/2005 | Gibson .......... 220/212 |
| 2006/0151415 A1 | 7/2006 | Smelko et al. |
| 2006/0172098 A1 | 8/2006 | Stevenson |
| 2010/0247887 A1 | 9/2010 | Turner |
| 2013/0011559 A1 | 1/2013 | Waning |

OTHER PUBLICATIONS

Final Office Action dated Jul. 28, 2016 in U.S. Appl. No. 14/079,619, 14 pages.
Non-Final Office Action dated Feb. 24, 2017 in U.S. Appl. No. 14/079,619, 12 pages.

* cited by examiner

FOOD CONTAINER TOP WITH INTEGRALLY FORMED UTENSIL

CROSS-REFERENCE TO RELATED APPLICATIONS

This patent application claims priority to provisional patent application No. 61/651,660 filed May 25, 2012 and entitled "Sealing Ring Lid with Integrated Eating or Other Utensil." The subject matter of provisional patent application No. 61/651,660 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

This invention relates to field of manufacturing, and more particularly relates to the field of plastics manufacturing of food containers.

BACKGROUND OF THE INVENTION

The plastics industry is one of the largest industries in the world, and the third largest manufacturing industry in the United States. In the U.S. alone, the plastics industry employs more than 885,000 people and creates more than $380 billion in annual revenue. One of the largest sectors of the plastics manufacturing industry is the food container manufacturing sector. Food containers comprised of plastics can take many forms, including bottles, cups, bowls, plates, jugs, boxes, etc. There is further a large variety of ways to manufacture and shape the various plastic food containers.

One of the most common types of food container includes a main housing, such as a bowl, a seal that covers the top of the main housing to seal in the food, and a removable top or lid that sits on top of the seal. A wide array of foods, both solids and in liquid form, are sold using this conventional food container. One of the problems associated with this type of container, however, is the expense associated with manufacturing the item. The manufacturing of the aforementioned conventional food container includes a process for forming the main housing, a separate process for placing the seal on the main housing and yet another process for both manufacturing the lid and placing the lid on the main housing. It is well known that each process undertaken during the manufacturing of a plastic product increases the time, materials, and expense associated with the manufacturing.

Another problem associated with the aforementioned conventional food container is its lack of versatility in use in various situations. With the increased time demands of modern society, many consumers today desire foods that can be purchased and eaten while on-the-go. This need is easily met with drink containers that can be opened and drank right out of the container. But when dealing with solid foods, consumers must pick up the food out of the container, which cannot be done cleanly without a utensil. Since most food containers don't come with utensils at the point of sale, this limits the versatility and ease-of-use of the conventional food container.

From the foregoing, it is apparent that there exists a definite need for a food container that can be manufactured in a more efficient manner and in such a way as to meet the desires of consumers.

SUMMARY OF THE INVENTION

Briefly, in accordance with one embodiment of the present invention, a method for producing a molded article comprising a food container top is disclosed. The method includes providing a mold for forming the molded article, wherein the mold defines a frame, a utensil located substantially coplanar with the frame and a frangible link between the frame and the utensil, providing an in-mold lidding film having a heat activatable lower surface, positioning the in-mold lidding film adjacent to an interior molding surface of the mold, molding the molded article from a heated thermoplastic resin contained within the mold, whereby the heated thermoplastic resin contacts a perimeter of the heat-activatable lower surface of the in-mold lidding film, and the perimeter of the heat-activatable lower surface of the in-mold lidding film is molded to the frame of the article such that the in-mold lidding film hermetically seals an opening defined by the frame, cooling the molded article, and removing the molded article from the mold.

In another embodiment, a molded article comprising a food container top is disclosed. The molded article includes a frame having a top surface and defining an opening, a utensil located substantially coplanar with, and integrally formed with, the frame, a frangible link between the frame and the utensil, an in-mold lidding film having a portion molded to the utensil and a perimeter molded to the frame such that the in-mold lidding film covers the opening defined by the frame, wherein the in-mold lidding film is hand peelable from the frame and the utensil, and a pull tab, formed from the in-mold lidding film, that extends past a perimeter of an upper surface of the frame.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

DETAILED DESCRIPTION

The present invention, according to a preferred embodiment, overcomes problems with the prior art by providing a simple and user-friendly plastic food container including a top having an integrally-formed removable seal and removable utensil, as well as an efficient mold-manufacturing method for forming the same. The present invention further solves problems with the prior art by providing a mold-manufacturing method that only requires one process or pass to add said top to the final food container product. This reduction in processes or passes decreases the time, materials, and expense associated with the manufacturing of said food containers. Further, the present invention solves problems with the prior art by providing a food container with an integrally formed utensil that can easily be removed and used by a consumer. This allows the manufacturer to provide a food container product that is more versatile in its use.

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawing, like numerals refer to like parts through several views.

Figure 1:
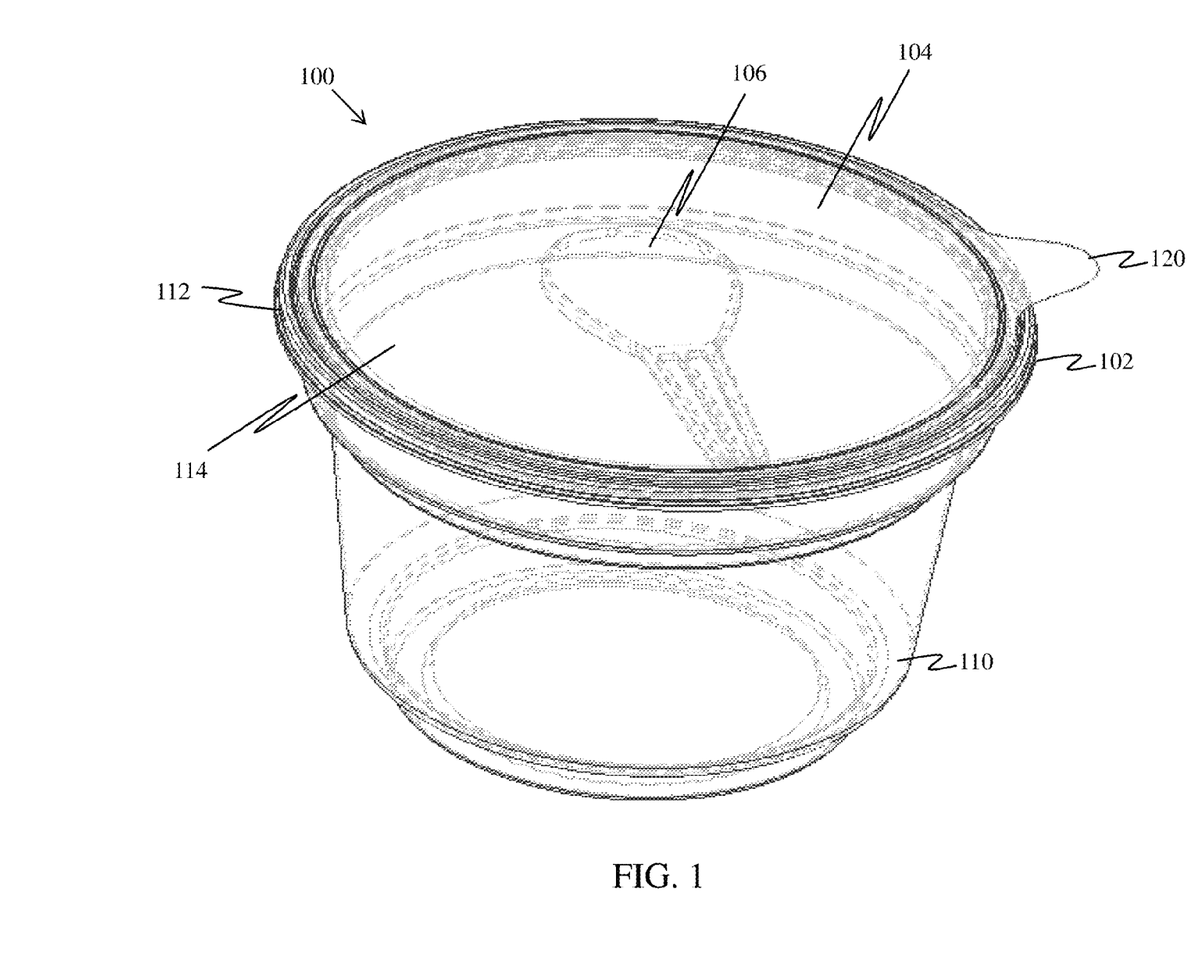
FIG. 1 is an illustration of a perspective view of a food container including a top having a removable seal and a removable utensil, in accordance with one embodiment.

FIG. 1 is an illustration of a perspective view of a food container 100 including a top 102 having a removable seal 104 and a removable utensil 106, in accordance with one embodiment. The food container 100 includes a compartment 110 comprising an element —in this case a cup— having a volume that holds the food included in the food container 100. The top 102, which comprises a frame or ring 112, is attached to an upper brim of the compartment 110, and the removable seal 104 is applied to the opening 114 defined by the ring 112, so as to completely cover the opening 114, and hermetically seal the food contents of the compartment 100.

A removable utensil 106—in this case a spoon—is attached to an inner circumference of the ring 112, while remaining under the seal 104. Thus, the utensil 106 is also hermetically sealed within the volume defined by the compartment 110. Lastly, FIG. 1 shows that the seal 104 includes a protruding portion or pull tab 120 that provides a finger grip for the consumer to remove or peel the seal 104 from the frame or ring 112. The consumer can grip the pull tab 120 with his fingers and, using regular finger/hand strength, peel back the removable seal 104 and expose the contents of the volume defined by the compartment 110, including the food contents of the food container 100, and the utensil 106. Once the seal 104 is removed, the consumer may remove the utensil 106 from the ring 112 and use it to eat the food contents. The utensil 106 may be removed by grasping, pulling, and/or twisting the utensil so as to break a frangible link, described more fully below.

It should be noted that although the present invention discloses a frame shown as a ring 112 having a circular shape, the present invention supports a frame of any shape, including rectangular, triangular, semi-circular, any parallelogram, irregular, or any combination of the above. Further, although the removable utensil 106 is shown as a spoon, the present invention supports any type of utensil, including a fork, knife, spork, spear, toothpick, any shape useful for extraction and deposition of the contained food product, or any combination of the above. In another embodiment, the removable utensil 106 comprises a foldable utensil including a first portion foldably connected to a second portion.

Further, in a preferred embodiment, the removable seal 104 is an in-mold lidding film comprising at least one of a metal foil, plastic, polyolefin, polyacrylate, polystyrene, polyamide, polyvinyl alcohol, poly(alkylene acrylate), poly (ethylene vinyl alcohol), poly(alkylene vinyl acetate), polyurethane, polyacrylonitrile, polyester, fluoropolymer, polycarbonate, or combinations thereof. In one embodiment, the removable seal 104, or a portion therof, may comprise an upper surface that is ink-printable, i.e., the upper surface allows for ink printing on its surface. In another embodiment, the removable seal 104, or a portion thereof, may be opaque, transparent, semi-transparent, or translucent. The removable seal 104 may further comprise a flexible membrane that possesses elastic characteristics.

Also in a preferred embodiment, the frame or ring 112 is composed of at least one of a thermoplastic, a thermosetting polymer, polyethylene, polypropylene, polystyrene, polyvinyl chloride, polytetrafluoroethylene (PTFE), polystyrene, polyvinyl chloride, nylon, polyester, polyethylene terephthalate, high density polyethylene, polyvinylidene chloride, high impact polystyrene, or mixtures thereof. The frame or ring 112 may further be composed of any moldable plastic, ABS plastic, injection grade plastic, bio-plastic or biodegradable plastic.

Figure 2:
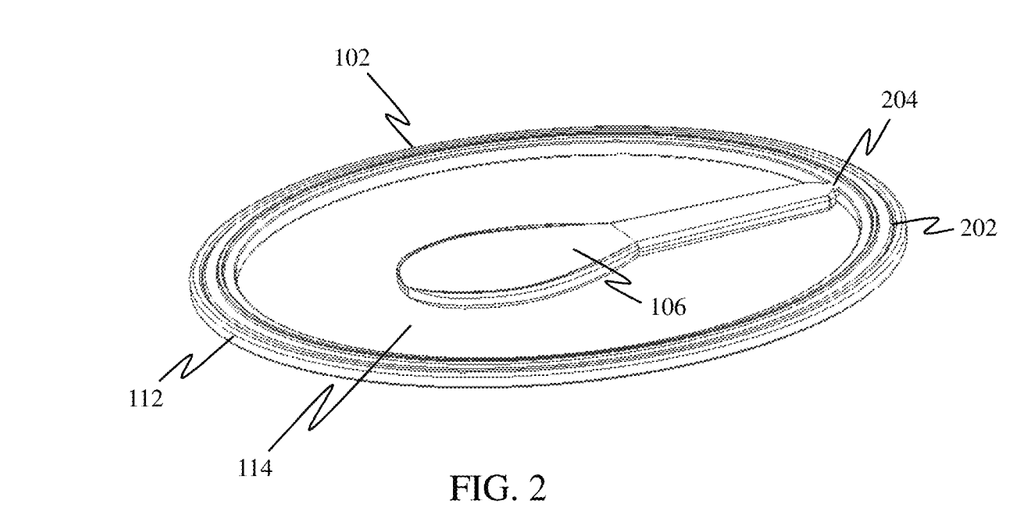
FIG. 2 is an illustration of a perspective view of the food container top of FIG. 1, in accordance with one embodiment.

FIG. 2 is an illustration of a perspective view of the food container top 102 of FIG. 1, in accordance with one embodiment. FIG. 2 shows that the top 102 includes a frame or ring 112 defining an opening 114. The removable utensil 106, which is integrally formed with the ring 112, is substantially coplanar with the ring 112. FIG. 2 also shows that the top surface of the ring 112 may include at least one raised lip or stacking ring 202 that extends around a perimeter of the ring 112. The stacking ring 202 may not extend the entire perimeter of the ring 112 and may include one or more interruptions wherein there is no raised surface or other element on the top surface of the ring 112.

FIG. 2 also shows that top 102 includes a frangible link 204 that allows the removable utensil 106 to be easily removed from the ring 112 using regular finger/hand strength. The frangible link 204 may be integrally formed with the utensil 106 and the ring 112 and may comprise a thickness and/or a width that is less than the thickness of the utensil 106 and/or the ring 112. This feature allows for the easy removal of the utensil 106 from the ring 112.

Figure 3:
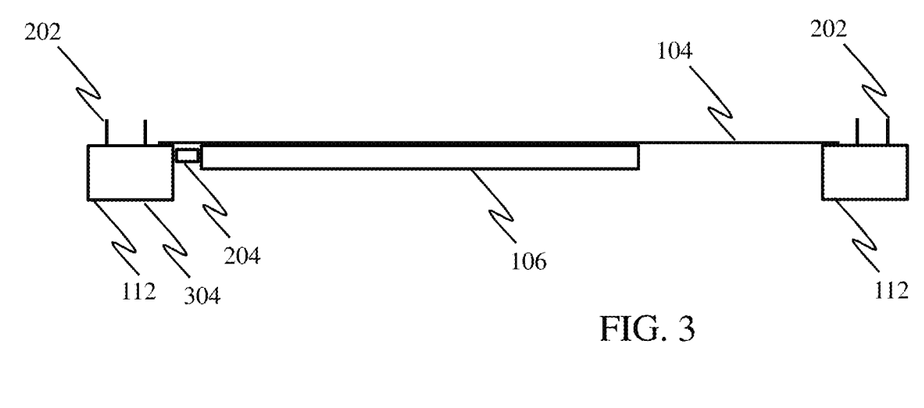
FIG. 3 is an illustration of a cross-sectional side view of the food container top of FIG. 1, in accordance with one embodiment.

FIG. 3 is an illustration (not drawn to scale) of a cross-sectional side view of the food container top 102 of FIG. 1, in accordance with one embodiment. FIG. 3 shows that the top surface of the ring 112 includes a raised lip or stacking ring 202 that extends around a perimeter of the ring 112. FIG. 3 also shows that the ring 112 includes a bottom surface 304, which may be coupled to the compartment 110, as described in greater detail below. Lastly, FIG. 3 shows that the lidding film 104 is coupled to a top surface of the ring 112, in a manner that allows the film 104 to be peeled back from the ring 112 using regular finger/hand strength. FIG. 3 also shows the frangible link 204, which may be integrally formed with the utensil 106 and the ring 112 and may comprise a thickness and/or a width that is less than the thickness of the utensil 106 and/or the ring 112.

Figures 4, 5:
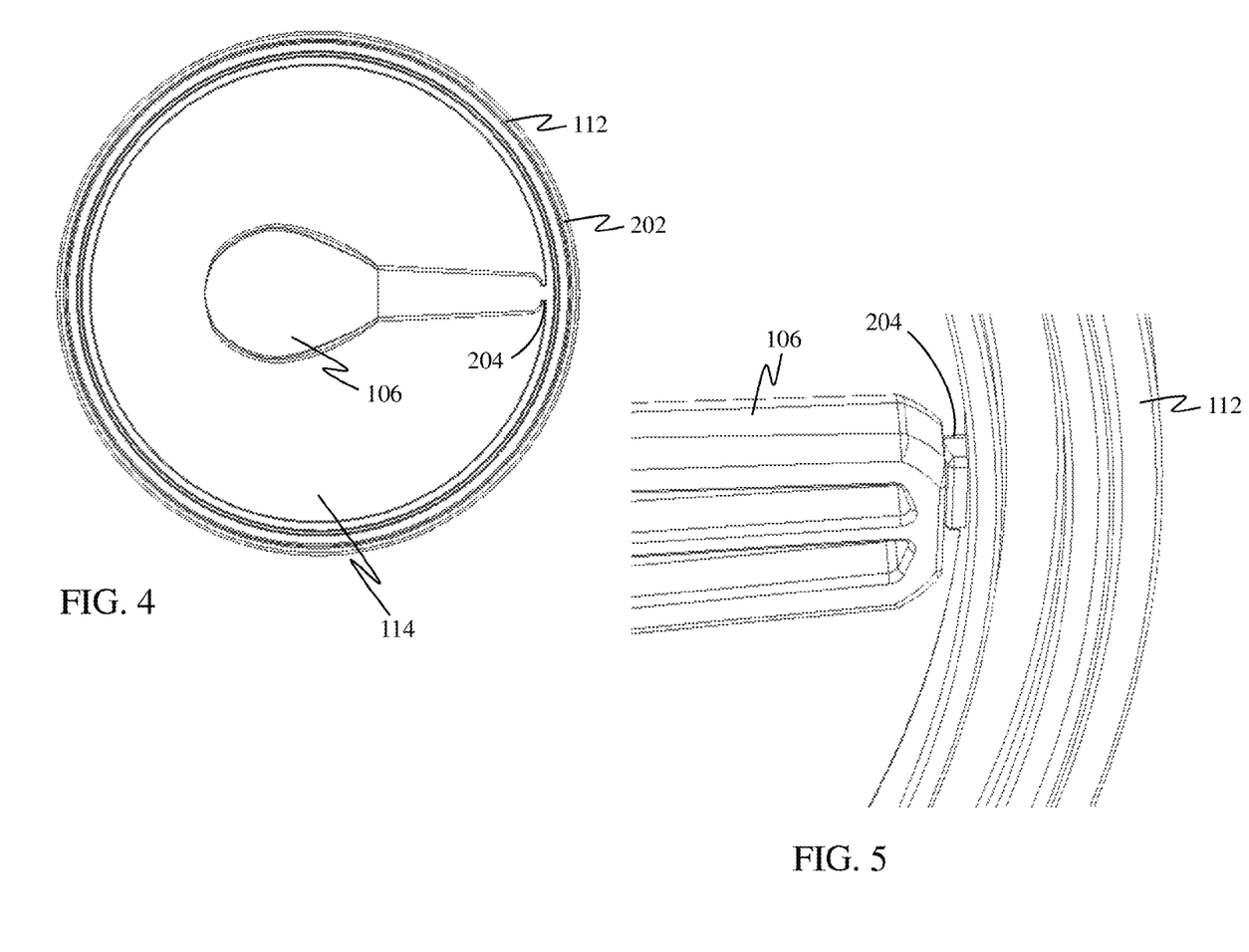
FIG. 4 is an illustration of a top view of the food container top of FIG. 1, in accordance with one embodiment.
FIG. 5 is an illustration of a detailed perspective view of the frangible link of the food container top of FIG. 1, in accordance with one embodiment.

FIG. 4 is an illustration of a top view of the food container top 102 of FIG. 1, in accordance with one embodiment. FIG. 4 shows that removable utensil 106 is integrally formed with the ring 112, and is substantially coplanar with the ring 112. FIG. 4 also shows a top view of the raised lip or stacking ring 202 that extends around a perimeter of the ring 112. FIG. 4 further shows the frangible link 204 that allows the removable utensil 106 to be easily removed from the ring 112 using regular finger/hand strength. The frangible link 204 is shown to be integrally formed with the utensil 106 and the ring 112 and comprises a width that is less than the width of the utensil 106. In another embodiment, the frangible link 204 comprises a width that is the same as, or greater than, the width of the utensil 106.

FIG. 5 is an illustration of a detailed perspective view of the frangible link 204 of the food container top 102 of FIG. 1, in accordance with one embodiment. FIG. 5 is a detailed view of the underside or bottom surface of the ring 112. The frangible link 204 is shown to be integrally formed with the utensil 106 and the ring 112 and comprises a width and a thickness that is less than the width and the thickness of the utensil 106. Further, the thickness of the link 204 is less than the thickness of the ring 112.

Figure 6:
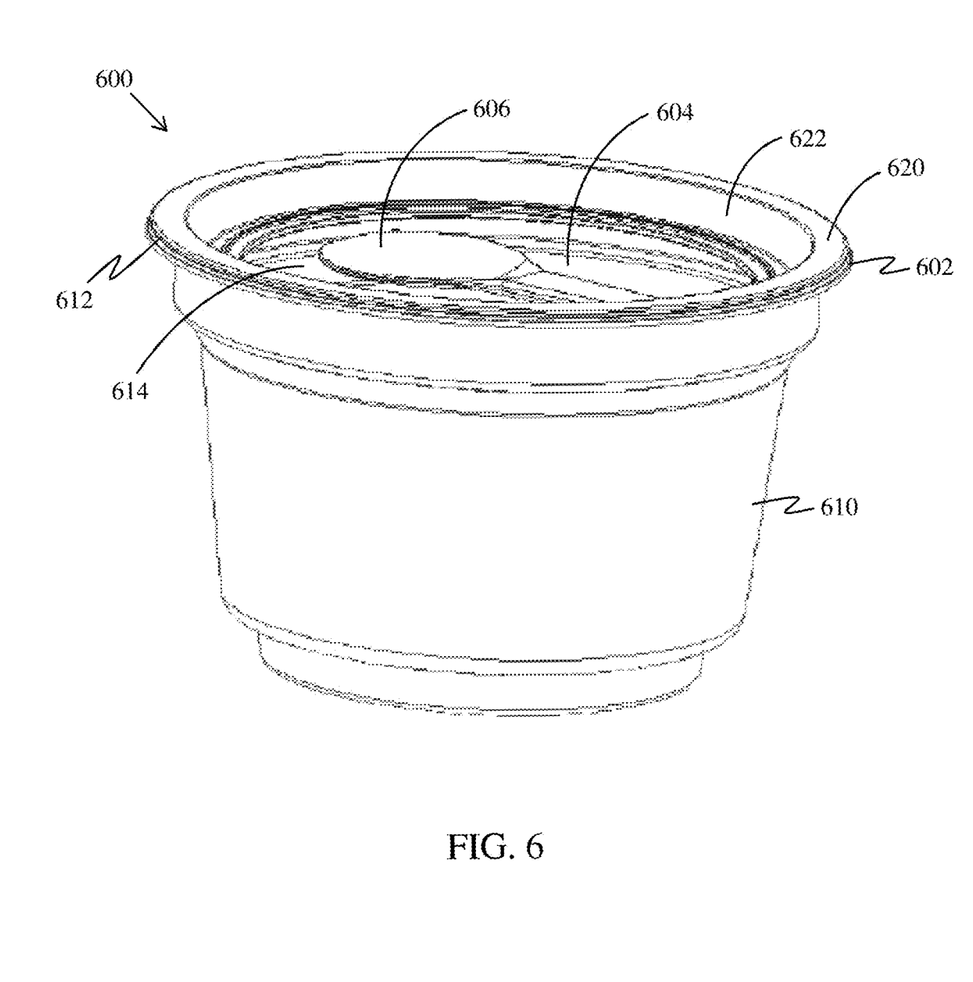
FIG. 6 is an illustration of a perspective view of a food container including a top having a seal and a removable utensil, in accordance with a second embodiment.

FIG. 6 is an illustration of a perspective view of a food container 600 including a top 602 having a seal 604 (not explicitly shown in the figure due to its transparent nature) and a removable utensil 606, in accordance with a second embodiment. Like the container 100 of FIG. 1, the food container 600 includes a compartment 610 comprising an element having a volume that holds the food included in the food container 600. The top 602, which comprises a frame or ring 612, is attached to an upper brim of the compartment 610, and the removable seal 604 is applied to the opening 614 defined by the ring 612, so as to completely cover the opening 614, and hermetically seal the food contents of the compartment 600. The removable utensil 606 is attached to an inner circumference of the ring 612, while remaining under the seal 604.

The main difference between the top 102 of FIG. 1 and the top 602 of FIG. 6 is that a portion of the ring 612 of the top 602 is recessed. That is, the seal or lidding film 604, as well as the utensil 606, are located in a plane that is below the plane of the top-most surface 620 of the food container top 602. The recessed feature of top 602 is due to the presence of a circular band 622 that connects the plane of the top-most surface 620 of the food container top 602 with the lower plane of the seal or lidding film 604, as well as the utensil 606. The circular band 622 also serves as a stacking ring, as described more fully below.

Figure 7:
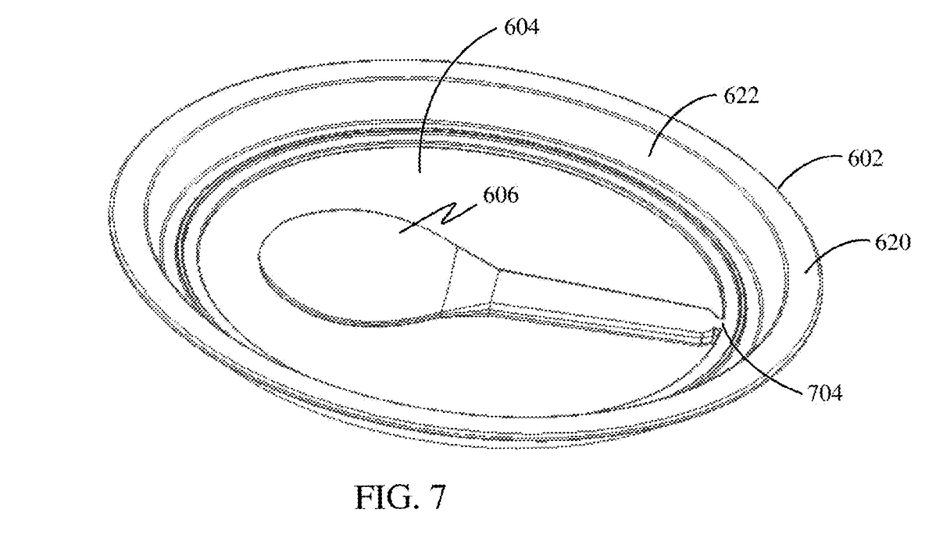
FIG. 7 is an illustration of a perspective view of the food container top of FIG. 6, in accordance with a second embodiment.

FIG. 7 is an illustration of a perspective view of the food container top 602 of FIG. 6, in accordance with the second embodiment. FIG. 7 also shows the circular band 622 that connects the plane of the top-most surface 620 of the food container top 602 with the lower plane of the seal or lidding film 604, as well as the utensil 606. FIG. 7 also shows that top 602 includes a frangible link 704 that allows the removable utensil 606 to be easily removed from the ring 612 using regular finger/hand strength.

Figure 8:
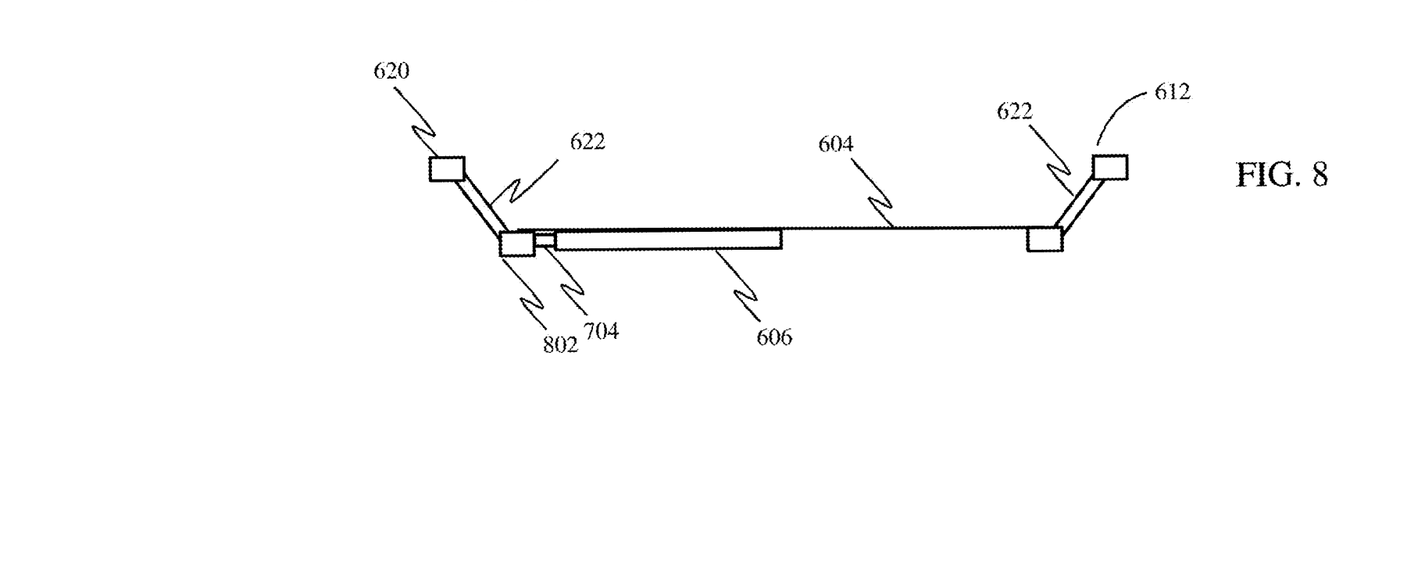
FIG. 8 is an illustration of a cross-sectional side view of the food container top of FIG. 6, in accordance with a second embodiment.

FIG. 8 is an illustration (not drawn to scale) of a cross-sectional side view of the food container top 602 of FIG. 6, in accordance with a second embodiment. FIG. 8 shows the circular band 622 that connects the plane of the top-most surface 620 of the food container top 602 with the lower plane of the seal or lidding film 604 and the utensil 606. FIG. 8 also shows that the ring 612 includes a bottom surface 802, which is coupled to the compartment 610, as described in greater detail below. Lastly, FIG. 8 shows that the lidding film 604 is coupled to a bottom plane of the ring 612, in a manner that allows the film 604 to be peeled back from the ring 612 using regular finger/hand strength.

Figures 9, 10:
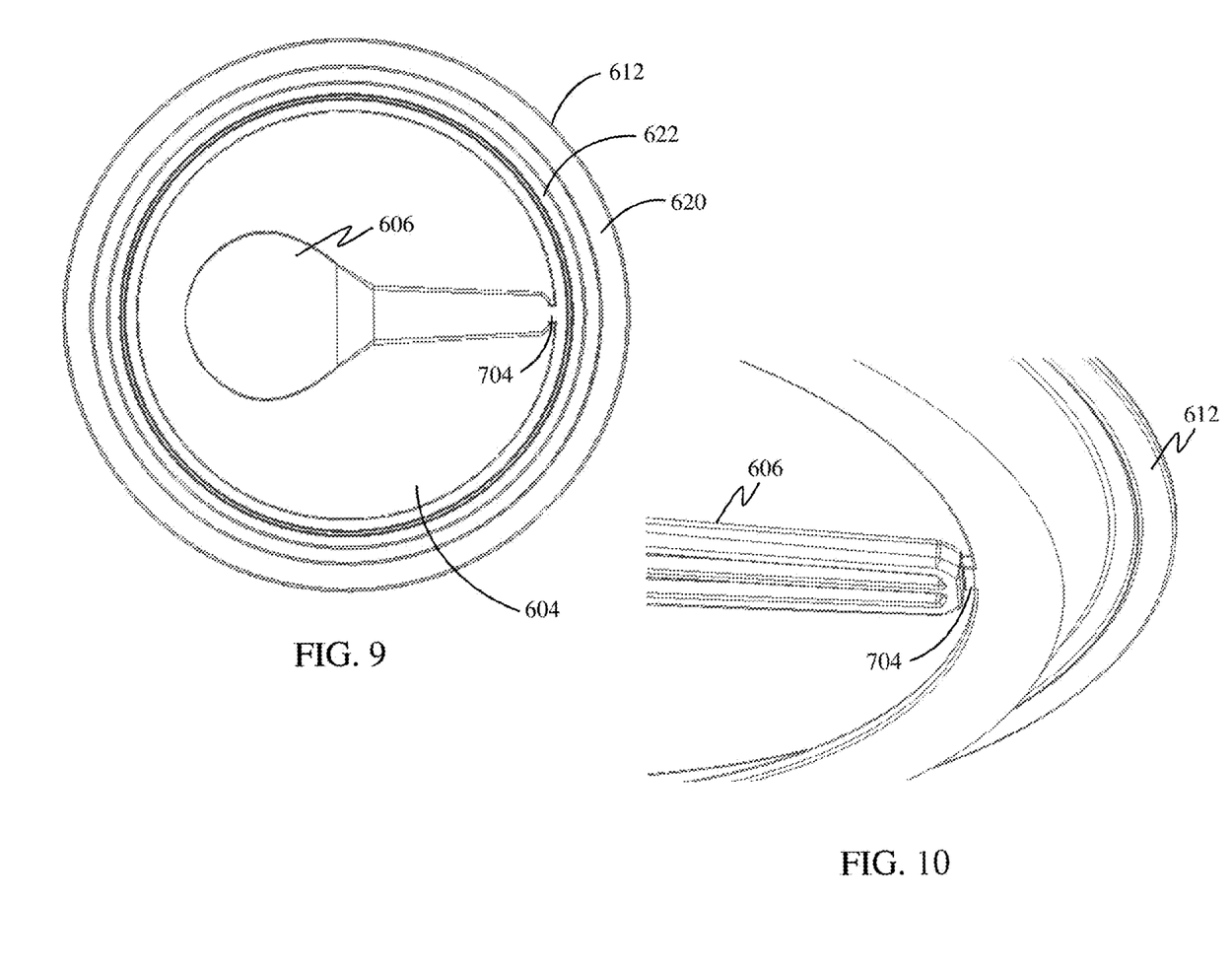
FIG. 9 is an illustration of a top view of the food container top of FIG. 6, in accordance with a second embodiment.
FIG. 10 is an illustration of a detailed perspective view of the frangible link of the food container top of FIG. 6, in accordance with a second embodiment.

FIG. 9 is an illustration of a top view of the food container top 602 of FIG. 6, in accordance with a second embodiment. FIG. 9 shows that removable utensil 606 is integrally formed with the ring 612, and is substantially coplanar with the lower surface of the ring 612, which also includes the lidding film 604. FIG. 9 also shows a top view of the circular band or stacking ring 622 that connects the plane of the top-most surface 620 of the food container top 602 with the lower plane of the seal or lidding film 604 and the utensil 606. FIG. 9 further shows the frangible link 704.

FIG. 10 is an illustration of a detailed perspective view of the frangible link 704 of the food container top of FIG. 6, in accordance with a second embodiment. FIG. 10 is a detailed view of the underside or bottom surface of the ring 612. The frangible link 704 is shown to be integrally formed with the utensil 606 and the ring 612 and comprises a width and a thickness that is less than the width and the thickness of the utensil 606. Further, the thickness of the link 704 is less than the thickness of the ring 612.

Figure 11:
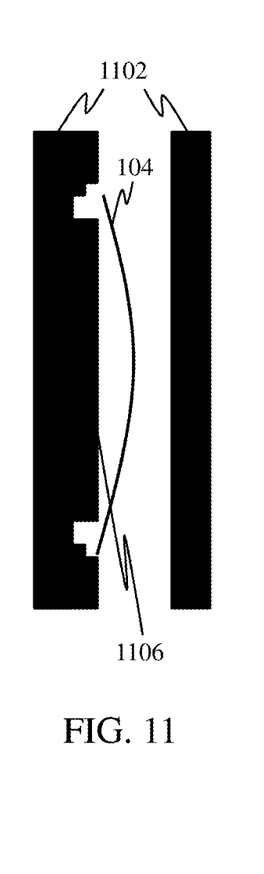
FIG. 11 is an illustration of a cross-sectional side view of a mold in an open state, wherein the mold is used in manufacturing the food container top of FIG. 1, in accordance with one embodiment.

FIG. 11 is an illustration of a cross-sectional side view of a mold 1102 in an open state, wherein the mold 1102 is used in manufacturing a molded article comprising the food container top 102 of FIG. 1, in accordance with one embodiment. The mold 1102 may be a positive mold, a negative mold, a mold including a core, etc. Further, the mold 1102 may support injection molding, positive phase or pressure thermoforming, and vacuum forming. FIG. 11 shows that the mold 1102 defines—in this case, using a cavity—the shape of a frame or ring 112, a utensil 106 located substantially coplanar with the frame and a frangible link 204 between the frame and the utensil.

The mold 1102 of FIG. 11 further supports a modified version of the in-mold labeling manufacturing process, wherein in-mold labeling is well known in the art. In-mold labeling is the use of labels during the manufacturing of containers by molding processes, such that the label serves as an integral part of the final product. FIG. 11 shows that the in-mold lidding film or seal 104 (shown in black) is placed inside of the mold 1102 and positioned adjacent or against an interior surface 1106 of the mold 1102. There are several techniques for inserting the film 104 into the mold and positioning it in the correct location within the mold during the in-mold labeling process. A vacuum may be used, as well as compressed air. Additional techniques include the use of an adhesive and static electricity.

Figure 12:
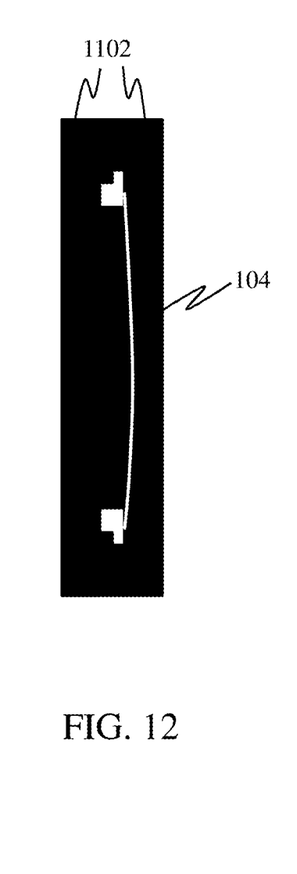
FIG. 12 is an illustration of a cross-sectional side view of the mold of FIG. 11 in a closed state, in accordance with one embodiment.

FIG. 12 is an illustration of a cross-sectional side view of the mold 1102 of FIG. 11 in a closed state, in accordance with one embodiment. While in a closed state, a heated thermoplastic resin is then injected into the cavity defined by the mold 1102. In this case, the mold 1102 defines a ring defining an opening, wherein the thermoplastic resin is not present in the opening. Note that whereas the conventional in-mold labeling process bonds an entire backing or rear of a label to the plastic product being molded, the process of the present invention modifies the in-mold labeling process by only allowing a portion of the backing or rear of a lidding film to be bonded to the plastic product. FIG. 12 further shows that the in-mold lidding film or seal 104 (shown in white) remains inside of the mold 1102 against an interior surface 1106 of the mold 1102 during the molding process. When the molding process is complete, the edges (or the perimeter) of the film 104 are coupled to the molded article (i.e., the ring) produced by the mold 1102, as explained in greater detail below.

Figure 13:
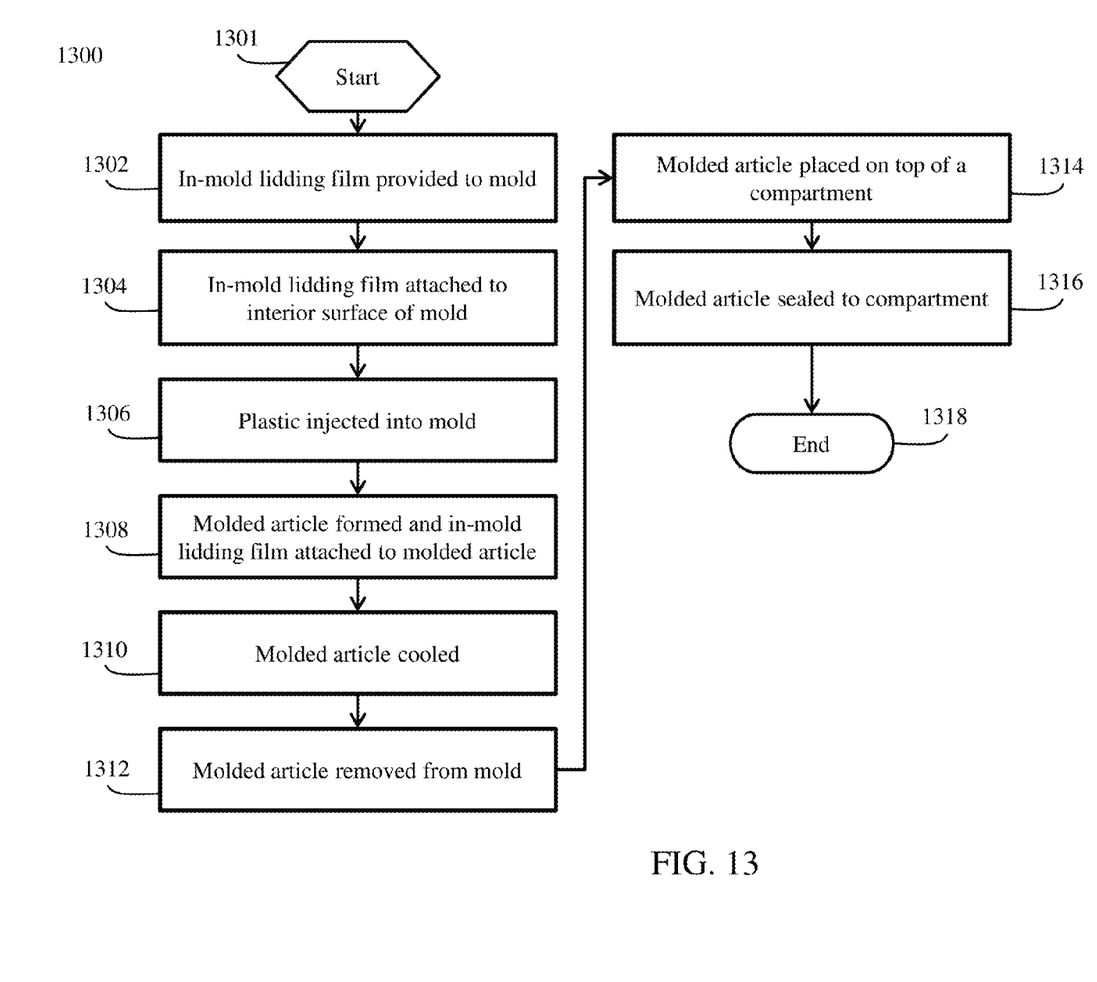
FIG. 13 is a flowchart showing the control flow of the process for manufacturing a food container including a top having a seal and a removable utensil, in accordance with one embodiment.

FIG. 13 is a flowchart showing the control flow of the process 1300 for manufacturing a food container 100 including a top 102 having a seal 104 and a removable utensil 106, in accordance with one embodiment. The process 1300 begins in step 1301 and immediately passes to step 1302, wherein the in-mold lidding film 104 is brought into the mold 1102 and in step 1304, the film 104 is positioned adjacent or against an interior surface 1106 of the mold 1102. In step 1306, a heated thermoplastic resin is injected into the mold 1102 and in step 1308, the molded article comprising the top 102 is formed wherein the lidding film 104 is coupled to the molded article 102.

In one embodiment, the film 104 includes a heat-activatable lower surface that causes the film 104 to exhibit a certain characteristics upon application of heat or of a certain amount and/or magnitude of heat, so as to improve bonding of the film 104 to the article 102 during the molding process. For example, the composition of the film 104, or of a lower surface or portion of the film 104, may be configured to change phase, exhibit adhesive properties, exhibit cohesion properties or form a bond with certain predefined other materials, when said heat is applied. In another example, the composition of the film 104, or of a lower surface or portion of the film 104, may be configured to be semi-compatible with the composition of the thermoplastic resin such that a bond is created between the film 104 and the thermoplastic resin (and/or the resulting plastic product) when said heat is applied. Said bond would be configured to hold the film 104 and the plastic product together with enough force to withstand normal shipping and handling forces related to the food container 100 but weak enough to allow the film 104 to be removed using normal finger/hand strength.

The heat-activatable material of film 104 is designed for and activated at temperatures known to those skilled in the art. Generally, the heat-activatable material has a lower melting point than the material used for the ring 112. Thus, the heat-activatable material is designed to activate at temperatures exhibited during the normal in-mold manufacturing process. Materials for the heat-activatable lower surface or portion of the film 104 may comprise any heat-activatable thermoplastic film material. Such materials include polyolefins, polystyrenes, polyacrylates and the like.

In yet another embodiment, the film 104 includes an adhesive (which may or may not be heat-activatable) on its lower surface that causes the film 104 to adhere to the plastic ring 112 during the molding process. Said adhesion would be configured to hold the film 104 and the plastic ring 112 together with enough force to withstand normal shipping and handling forces related to the food container 100 but weak enough to allow the film 104 to be removed using normal finger/hand strength. Materials for the heat-activatable lower surface or portion of the film 104 may comprise any heat-activatable adhesive.

In step 1308, the heated thermoplastic resin may contact a perimeter of the heat-activatable lower surface of the in-mold lidding film 104, thereby activating the heat-activatable properties of the film 104. Thus, the temperature of the heated thermoplastic resin is configured to match the heat-activatable properties of the lower surface of the in-mold lidding film 104. This causes the perimeter of the heat-activatable lower surface of the in-mold lidding film 104 to be molded to the frame or ring 112 of the molded article such that the in-mold lidding film 104 hermetically seals the opening 114 defined by the frame or ring 112. In one embodiment, the perimeter of the lidding film 104 may refer to an outer circumference of the edges of the lidding film, or the perimeter may refer to a perimeter margin, defined as an area defined by the outer boundary of the in-mold lidding film and a boundary of substantially similar shape located to the interior of the outer boundary.

In a further embodiment of step 1308, the heated thermoplastic resin may contact an area of the heat-activatable lower surface of the in-mold lidding film 104 adjacent to the utensil 106, thereby activating the heat-activatable properties of the film 104 adjacent to the utensil 106. Consequently, said area of the lower surface of the in-mold lidding film 104 is molded to the utensil 106 of the molded article such that the in-mold lidding film 104 may be peeled from the utensil 106, as well as the frame or ring 112.

In step 1310, the molded article 102 is cooled and in step 1312 the molded article 102 is removed from the mold 1102. In step 1314, the top 102 is placed on top of the compartment 110 and in step 1316, the bottom surface of the top 102 is hermetically sealed to a top opening of the compartment 110, so as to seal in the food contents of the compartment 110. In another embodiment, the step of hermetically sealing includes ultrasonically welding the bottom surface of the top 102 to a top opening of the compartment 110. In yet another embodiment, the step of hermetically sealing includes the use of alternative technologies, such as laser welding, heat application, etc. In step 1318, the process 1400 ceases.

Figure 14:
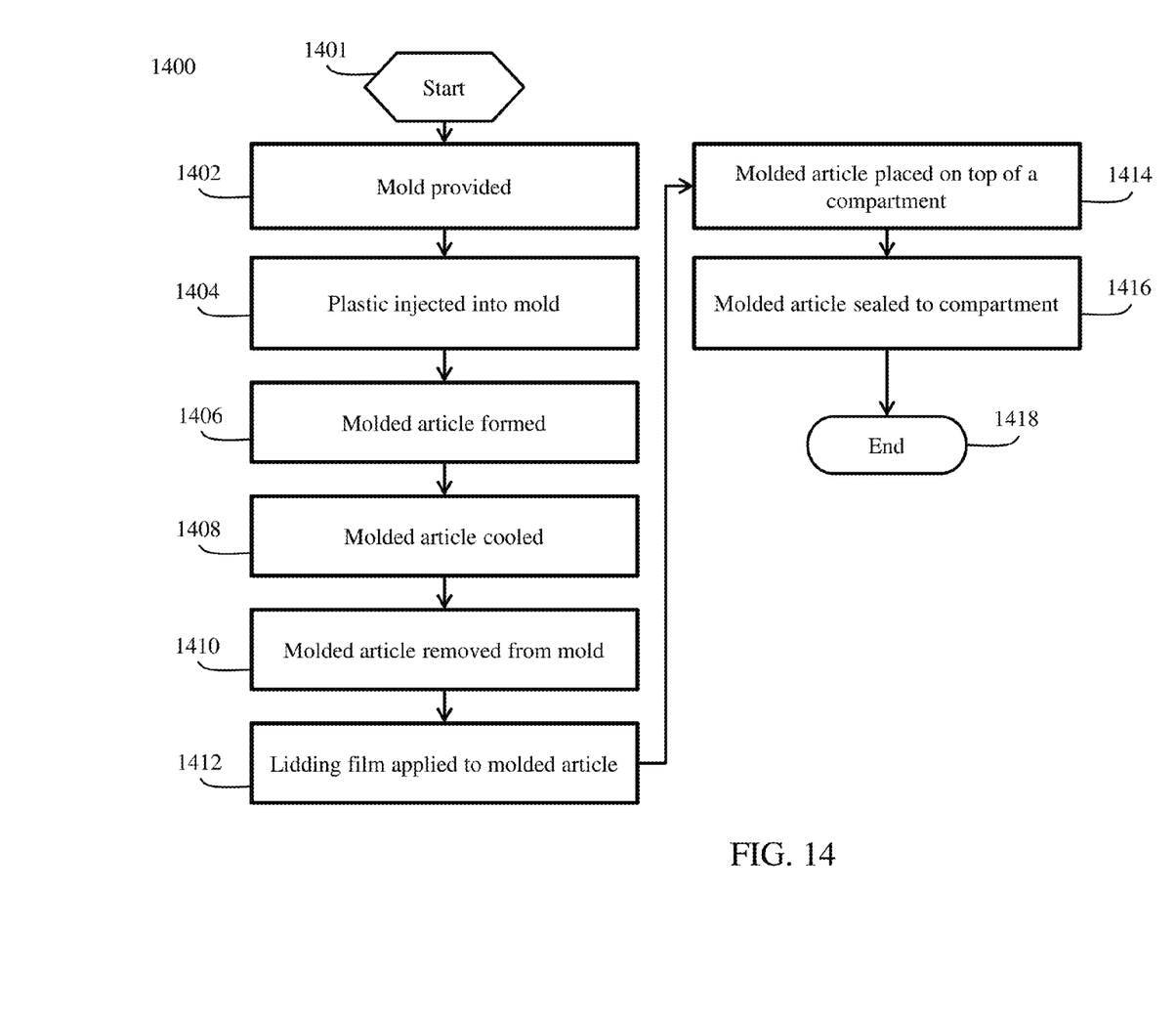
FIG. 14 is a flowchart showing the control flow of an alternative process for manufacturing a food container including a top having a seal and a removable utensil, in accordance with one embodiment.

FIG. 14 is a flowchart showing the control flow of an alternative process for manufacturing a food container 100 including a top 102 having a seal 104 and a removable utensil 106, in accordance with one embodiment.

The process 1400 begins in step 1401 and immediately passes to step 1402, wherein the mold 1102 is provided, in step 1404 the heated thermoplastic resin is injected into the mold 1102 and in step 1406, the molded article comprising the top 102 is formed. In step 1408, the molded article 102 is cooled and in step 1410 the molded article 102 is removed from the mold 1102. In step 1412, the seal or film 104 is coupled to the ring 112 so as to hermetically seals the opening 114 defined by the frame or ring 112. In another embodiment, the step of hermetically sealing includes ultrasonically welding and includes the use of alternative technologies.

In step 1414, the top 102 is placed on top of the compartment 110 and in step 1416, the bottom surface of the top 102 is hermetically sealed to a top opening of the compartment 110, so as to seal in the food contents of the compartment 110. In step 1418, the process 1400 ceases.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

We claim:

1. A method for producing a molded article comprising a food container top, the method comprising:
    providing a mold for forming the molded article, wherein the mold defines a frame, a utensil located substantially coplanar with the frame and a frangible link between the frame and the utensil, wherein the utensil is shaped like a spoon having a shaft and a scoop with a continuous surface or wherein the utensil is shaped like a fork;
    providing an in-mold lidding film having a heat activatable lower surface, wherein the film comprises a thin, flexible, membranous covering;
    positioning the in-mold lidding film adjacent to an interior molding surface of the mold;
    molding the molded article from a heated thermoplastic resin contained within the mold, whereby the heated thermoplastic resin contacts a perimeter of the heat-activatable lower surface of the in-mold lidding film, and the perimeter of the heat-activatable lower surface of the in-mold lidding film is molded to the frame of the article such that the in-mold lidding film hermetically seals an opening defined by the frame, wherein the in-mold lidding film is molded to the utensil, and wherein the in-mold lidding film is configured so as to be hand peelable from the frame and the utensil;
    cooling the molded article; and
    removing the molded article from the mold.

2. The method of claim 1, wherein the in-mold lidding film comprises at least one of a metal foil, plastic, polyolefin, polyacrylate, polystyrene, polyamide, polyvinyl alcohol, poly(alkylene acrylate), poly(ethylene vinyl alcohol), poly(alkylene vinyl acetate), polyurethane, polyacrylonitrile, polyester, fluoropolymer, polycarbonate, or mixtures thereof.

3. The method of claim 2, wherein the in-mold lidding film is transparent.

4. The method of claim 2, wherein the in-mold lidding film comprises an ink-printable upper surface.

5. The method of claim 2, wherein a portion of the heat-activatable lower surface of the in-mold lidding film is molded to an entire surface of the utensil of the article facing the in-mold lidding film.

6. The method of claim 5, wherein the frame includes a raised stacking ring extending around a perimeter of an upper surface of the frame.

7. The method of claim 6, wherein the raised stacking ring includes one or more interruptions in the ring.

8. The method of claim 5, wherein the in-mold lidding film includes a pull tab that extends past a perimeter of an upper surface of the frame.

9. The method of claim 1, wherein the film has elastic characteristics.

10. The method of claim 1, wherein the film comprises polyolefin.

11. A method for producing a food container, comprising:
    providing a mold for forming a molded article, wherein the mold defines a frame, a utensil located substantially coplanar with the frame and a frangible link between the frame and the utensil, wherein the utensil comprises a shaft and a scoop with a continuous surface;
    providing an in-mold lidding film having a heat activatable lower surface, wherein the film comprises a thin, flexible, membranous covering;
    positioning the in-mold lidding film adjacent to an interior molding surface of the mold;
    molding the molded article from a heated thermoplastic resin contained within the mold, whereby the heated thermoplastic resin contacts a perimeter of the heat-activatable lower surface of the in-mold lidding film, and the perimeter of the heat-activatable lower surface of the in-mold lidding film is molded to the frame of the article such that the in-mold lidding film hermetically seals an opening defined by the frame, wherein the in-mold lidding film is molded to the utensil, and wherein the in-mold lidding film is configured so as to be hand peelable from the frame and the utensil;
    cooling the molded article;
    removing the molded article from the mold; and
    hermetically sealing a bottom surface of the frame of the molded article to a top surface of a compartment, so as to cover an opening in the compartment.

12. The method of claim 11, wherein the in-mold lidding film comprises at least one of a metal foil, paper, plastic, polyolefin, polyacrylate, polystyrene, polyamide, polyvinyl alcohol, poly(alkylene acrylate), poly(ethylene vinyl alcohol), poly(alkylene vinyl acetate), polyurethane, polyacrylonitrile, polyester, fluoropolymer, polycarbonate, or mixtures thereof.

13. The method of claim 12, wherein the in-mold lidding film is transparent.

14. The method of claim 12, wherein the in-mold lidding film comprises an ink-printable upper surface.

15. The method of claim 12, wherein a portion of the heat-activatable lower surface of the in-mold lidding film is molded to an entire surface of the utensil of the article facing the in-mold lidding film.

16. The method of claim 15, wherein the frame includes a raised stacking ring extending around a perimeter of an upper surface of the frame.

17. The method of claim 16, wherein the raised stacking ring includes one or more interruptions in the ring.

18. The method of claim 15, wherein the in-mold lidding film includes a pull tab that extends past a perimeter of an upper surface of the frame.

19. The method of claim 12, wherein the step of hermetically sealing further comprises: ultrasonically welding the bottom surface of the frame of the molded article to the top surface of a compartment, so as to cover the opening in the compartment.

20. A method for producing a food container, comprising:
    providing a mold for forming a molded article, wherein the mold defines a frame, a utensil located substantially coplanar with the frame and a frangible link between the frame and the utensil, wherein the utensil is shaped like a spoon or like a fork;
molding the molded article from a heated thermoplastic resin contained within the mold;
cooling the molded article;
removing the molded article from the mold;
providing a lidding film, wherein the film comprises a thin, flexible, membranous covering;
coupling a perimeter of a lower surface of the lidding film to the frame of the article such that the lidding film hermetically seals an opening defined by the frame, wherein the lidding film is molded to the utensil, and wherein the lidding film is configured so as to be hand peelable from the frame and the utensil; and
hermetically sealing a bottom surface of the frame of the molded article to a top surface of a compartment, so as to cover an opening in the compartment.

\* \* \* \* \*